US012713190B2

(12) United States Patent
Ignatenko et al.

(10) Patent No.: US 12,713,190 B2
(45) Date of Patent: Aug. 18, 2026

(54) FITTING AGENT WITH USER MODEL INITIALIZATION FOR A HEARING DEVICE

(71) Applicant: GN Hearing A/S, Ballerup (DK)

(72) Inventors: Tanya Ignatenko, Eindhoven (NL); Kirill Kondrashov, Helmond (NL); Aalbert De Vries, Eindhoven (NL)

(73) Assignee: GN HEARING A/S, Ballerup (DK)

( * ) Notice: Subject to any disclaimer, the term of this patent is extended or adjusted under 35 U.S.C. 154(b) by 186 days.

(21) Appl. No.: 18/373,235

(22) Filed: Sep. 26, 2023

(65) Prior Publication Data

US 2024/0129679 A1 Apr. 18, 2024

(30) Foreign Application Priority Data

Sep. 29, 2022 (DK) ........................... PA 2022 70473

(51) Int. Cl.
*H04R 25/00* (2006.01)

(52) U.S. Cl.
CPC ........... *H04R 25/70* (2013.01); *H04R 25/505* (2013.01)

(58) Field of Classification Search
CPC ....... H04R 25/00; H04R 25/70; H04R 25/505
See application file for complete search history.

(56) References Cited

U.S. PATENT DOCUMENTS

| | | | | |
|---|---|---|---|---|
| 2014/0146986 A1* | 5/2014 | Ypma | H04R 25/505 381/314 |
| 2014/0211972 A1 | 7/2014 | Kim et al. | |
| 2021/0160626 A1 | 5/2021 | Zukic | |

FOREIGN PATENT DOCUMENTS

| | | |
|---|---|---|
| EP | 3267695 | 1/2018 |
| EP | 3493555 | 6/2019 |
| EP | 4050912 | 8/2022 |
| EP | 4060557 | 9/2022 |
| EP | 4106350 | 12/2022 |
| WO | WO 2020/144160 | 7/2020 |

OTHER PUBLICATIONS

Foreign First Technical Examination for Danish Patent Appln. No. PA 2022 70473 dated Mar. 28, 2023.
European Search Report for EP Patent Appln. No. 23200393 dated Jan. 24, 2024.
Foreign Exam Report for EP Patent Appln. No. 23 200 393.9 dated Jan. 22, 2026.

* cited by examiner

*Primary Examiner* — Suhan Ni
(74) *Attorney, Agent, or Firm* — Vista IP Law Group, LLP

(57) ABSTRACT

A fitting system includes one or more processors configured to: initialize a user model; obtain a test setting comprising a primary test setting and a secondary test setting; output the primary test setting and the secondary test setting for presentation to a user; obtain a user input for a preferred test setting indicative of a preference for either the primary test setting or the secondary test setting; and update the user model based on a hearing device parameter of the preferred test setting; wherein the one or more processors are configured to initialize the user model by: obtaining a profile of the user; obtaining a group of reference users; obtaining reference posteriors of reference users in the group of reference users; determining a collaborative user preference distribution based on the reference posteriors; setting the collaborative user preference distribution as a prior; and initializing the user model based on the prior.

16 Claims, 4 Drawing Sheets

FITTING AGENT WITH USER MODEL INITIALIZATION FOR A HEARING DEVICE

RELATED APPLICATION DATA

This application claims priority to, and the benefit of, Danish Patent Application No. PA 2022 70473 filed on Sep. 29, 2022. The above application is expressly incorporated by reference herein.

FIELD

The present disclosure relates to hearing devices and related tools, methods, and systems in particular for one or more of determining, tuning, fitting and optimizing hearing device parameters. Thus, a fitting agent for a hearing device and related methods, in particular a method for updating a user model, are provided.

BACKGROUND

Fitting and tuning of hearing devices or hearing aids has always been considered a tedious task of healthcare professionals (HCPs). Traditional approaches for fitting hearing device parameters rely on compensation of a user's hearing loss, based on audiograms, by applying rules such as NAL-NL1 or NAL-NL2, which do not consider individual user preferences. In addition, tuning of the hearing device parameters is usually not performed at the time and place that dissatisfactions occur, but only after a user shares his/her experience with a HCP. The tuning result thus heavily depends on the HCP's experience, expertise, and ad hoc feedback provided by users. In practice, hearing device users are seldom fully satisfied with the tuning result, which leads to recurrent visits to HCPs and less frequent hearing device use.

Therefore, it would be beneficial to the users to find hearing device parameter settings that satisfy their personalized preferences without unnecessary visits to the HCP. One method to solve this problem is to design an interactive agent that learns a user's preference. In order to do so, the agent has to learn and predict the user's preference by using the information generated during the interactions between the agent and the user.

Recent approaches involve preference learning for hearing devices.

EP 3 493 555 A1 relates to a method for tuning hearing device parameters of a hearing device and a hearing device. The method comprises initializing a model; obtaining an initial test setting defined by one or more initial test hearing device parameters; assigning the initial test setting as a primary test setting; obtaining a secondary test setting based on the model; outputting a primary test signal according to the primary test setting; outputting a secondary test signal according to the secondary test setting; detecting a user input of a preferred test setting; updating the model based on the primary test setting, the secondary test setting, and the preferred test setting; and in accordance with a determination that a tuning criterion is satisfied, updating the hearing device parameters of the hearing device based on hearing device parameters of the preferred test setting.

SUMMARY

Challenges still remain in improving the tools, methods and devices allowing an improved fitting and tuning of hearing device parameters. Particularly, to enable a user to tune his/her parameters with as few interactions with the agent as possible.

A fitting agent (system) is disclosed, the fitting agent optionally being for a hearing device system comprising a hearing device worn by a hearing device user. The fitting agent comprises one or more processors configured to initialize a user model comprising a user preference function and user response distribution; obtain a test setting comprising a primary test setting and a secondary test setting for the hearing device based on the user model; present the primary test setting and the secondary test setting to a user; detect a user input of a preferred test setting indicative of a preference for either the primary test setting or the secondary test setting; and update the user model based on hearing device parameters of the preferred test setting, wherein to initialize the user model comprises obtain a profile of the user; optionally obtain environment data indicative of a present environment; optionally determine a first initial environment probability of a first environment and a second initial environment probability of a second environment based on the environment data; obtain a group of reference users; obtain reference posteriors of reference users in the group of reference users, wherein a reference posterior is a posterior of the preferred hearing device parameters of a reference user in the group; determine a collaborative user preference distribution based on the reference posteriors; set the collaborative user preference distribution as a prior associated with the user; and initialize the user model based on the prior.

Also, a method for updating a user model for a hearing device user is disclosed, wherein the method comprises initializing a user model comprising a user preference function and user response distribution; obtaining a test setting comprising a primary test setting and a secondary test setting for the hearing device based on the user model; presenting the primary test setting and the secondary test setting to the user; detecting a user input of a preferred test setting indicative of a preference for either the primary test setting or the secondary test setting; and updating the user model based on hearing device parameters of the preferred test setting, wherein initializing the user model comprises: obtaining a profile of the user; optionally obtaining environment data indicative of a present environment; optionally determining a first initial environment probability of a first environment and a second initial environment probability of a second environment based on the environment data; obtaining a group of reference users; obtaining reference posteriors of reference users in the group of reference users, wherein a reference posterior is a posterior of the preferred hearing device parameters of a reference user in the group; determining a collaborative user preference distribution based on the reference posteriors; setting the collaborative user preference distribution as a prior associated with the user; and initializing the user model based on the prior.

Since the ideal interactions between the agent and the user are unobtrusive, the interactions are implemented as pairwise comparisons, i.e., the comparison of the primary and secondary test settings, which allows the user to provide binary feedback, i.e. whether the primary or secondary test setting is preferred, through a simple tap or gesture. The pairwise proposals compare the current parameter setting, i.e. the primary test setting, with an alternative setting that is generated by the agent, i.e. the secondary test setting.

In the prior art, high a priori uncertainty about hearing device parameters preferred by the user negatively affects the speed and stability of any parameter preferences learning procedure in the beginning. This is typically the case when preferences have to be learned for multiple (acoustic) environments. Moreover, even experienced users would benefit from good initial points when they arrive in a new environment, which they did not have a chance to personalize. The present disclosure helps the user with a good initial starting point by using reference posteriors of reference users so that the user model does not start from scratch.

In short, the agent uses preferences of other users, i.e. collaborative priors, as a springboard for learning the user in questions preferences. The assumption that the collective preferences of other uses are at least to some degree also the preference of the user in question is made even more valid by using the preferences of references users which share characteristics with the user, e.g. age or gender, or have similar daily behaviour, e.g. work involving a lot of conversation or frequent conversations with multiple people in noise environments. This can save the user's time and may also help in achieving a more reliable result. Moreover, staring with an initial point that was already personalized by other similar users offers a more comfortable experience.

Further, the present disclosure provides an efficient automated search for optimal hearing device parameters by incorporating user feedback into the learning cycle. A fitting agent, devices, and methods are provided, that allows to learn user preferences for hearing device parameters in an efficient and minimally obtrusive way by empowering the user to take direct decisions and have direct impact on the fitting and/or tuning process.

Further, the present disclosure allows hearing device parameters to be configured, such as fitted and/or tuned, during a normal operating situation and/or with a small number of user inputs/interactions. Thus, a simple and smooth user experience of the hearing device is provided.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
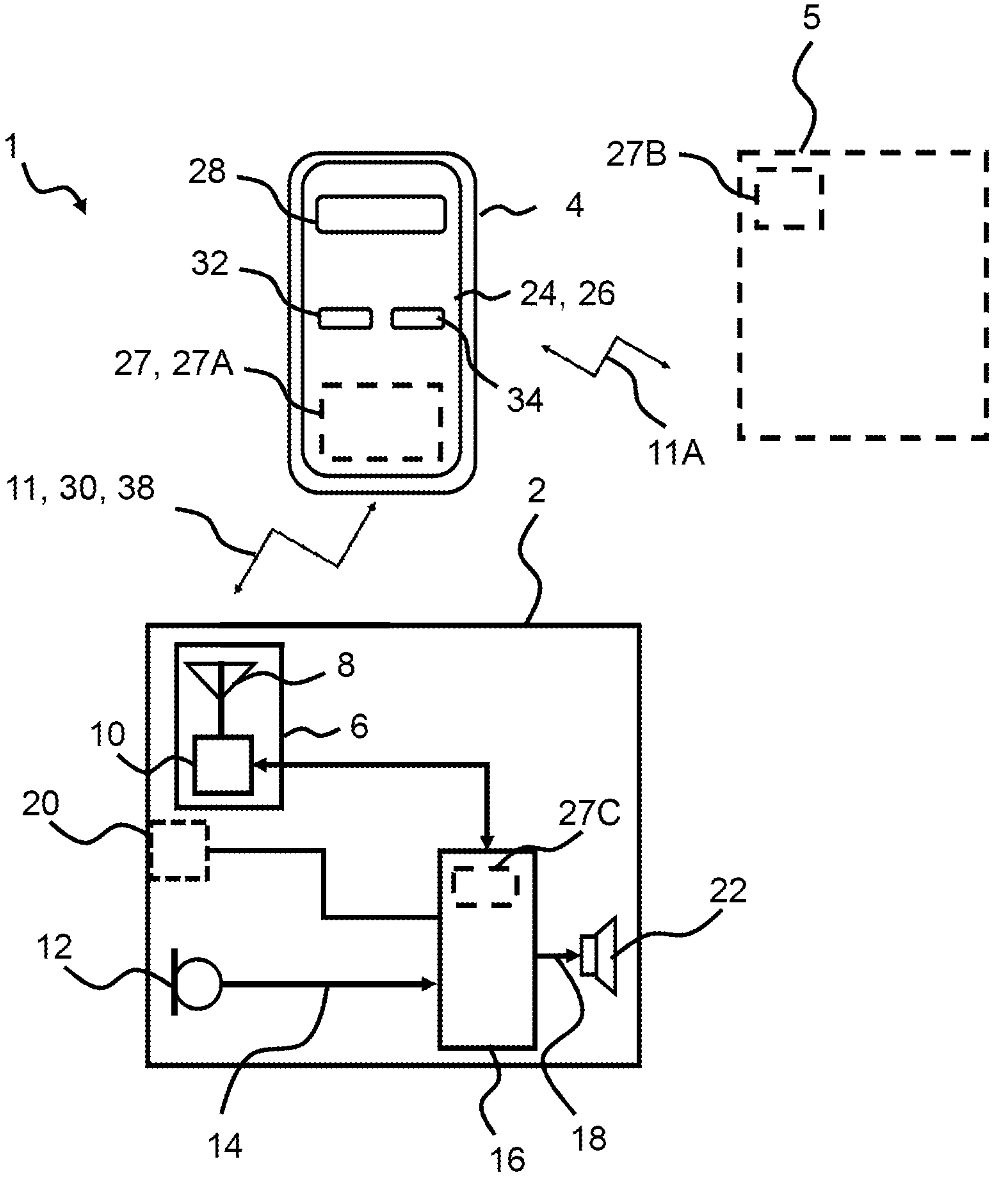
FIG. 1 schematically illustrates a hearing system according to the present disclosure.

Various exemplary embodiments and details are described hereinafter, with reference to the figures when relevant. It should be noted that elements of similar structures or functions are represented by like reference numerals throughout the figures. It should also be noted that the figures are only intended to facilitate the description of the embodiments. They are not intended as an exhaustive description of the invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A fitting agent is disclosed. The fitting agent or at least a first part thereof may be implemented, e.g. as an application, in an accessory device, such as an electronic device. The accessory device comprises an interface, a processor, and a memory. The accessory device may for example be or comprise a mobile phone, such as a smartphone, a smartwatch, a special purpose device, a computer, such as a laptop computer or PC, or a tablet computer. The fitting agent or at least a second part thereof may be implemented in a server device. The fitting agent or at least a third part thereof may be implemented in a hearing device.

The present disclosure relates to a hearing device system, fitting agent, accessory device and hearing device of the hearing device system, and related methods. The accessory device forms an accessory device to the hearing device. The accessory device is typically paired or wirelessly coupled to the hearing device. The hearing device may be a hearing aid, e.g. of the behind-the-ear (BTE) type, in-the-ear (ITE) type, in-the-canal (ITC) type, receiver-in-canal (RIC) type, receiver-in-the-ear (RITE) type, or microphone-and-receiver-in-the-ear (MaRIE) type. The hearing device may be a hearable, such as a pair of earbuds or a headset. Typically, the hearing device system is in possession of and controlled by the hearing device user.

The hearing device system may comprise a server device and/or a fitting device. The fitting device is controlled by a dispenser and is configured to determine configuration data, such as fitting parameters. The server device may be controlled by the hearing device manufacturer.

The fitting agent may be a fitting agent for a hearing device system comprising a hearing device worn by a hearing device user.

The fitting agent comprises one or more processors. The one or more processors are configured to initialize a user model comprising one or a plurality of user preference functions, optionally with associated preference function parameter distributions, and optionally associated user response distributions. Each user preference function is optionally associated with an environment, such as an acoustic environment.

The fitting agent, such as one or more processors of the fitting agent, is configured to obtain environment data indicative of a present environment. The environment data may comprise signal vector or signal matrix denoted s of one or more input signals and/or other contextual information or any parameter determined based thereon, such as signal-to-noise ratio (SNR) and power.

An environment, such as an acoustic environment, may be characterized by one or more of a first environment parameter, such as input signal level or input power, and a second environment parameter, such as SNR, for one or more input signals. In other words, the environment data may comprise a (first) SNR and/or a (first) power of a (first) input signal. Thus, to obtain environment data indicative of a present environment may comprise to obtain, such as determine or receive, one or more environment parameters optionally including a (first) SNR and/or a (first) power of a (first) input signal.

The fitting agent, such as one or more processors of the fitting agent, is configured to obtain, such as one or more of determine, receive, and retrieve, a test setting comprising a primary test setting and/or a secondary test setting for the hearing device.

The fitting agent, such as one or more processors of the fitting agent, is configured to present the test setting to the hearing device user. The fitting agent is configured to present the test setting to the hearing device user. To present the test setting to the hearing device user comprises presenting the primary test setting and/or the secondary test setting to a user. To present the primary test setting and the secondary test setting to a user optionally comprises to output a primary test signal according to the primary test setting. The primary test signal may be an audio signal. The primary test signal may be output via loudspeaker or receiver of a hearing device. To present the primary test setting and the secondary test setting to a user optionally comprises to generate the primary test signal according to the primary test setting in accessory device and to stream the primary test signal from accessory device to hearing device. To present the primary test setting and the secondary test setting to a user optionally comprises to transmit a control signal indicative of primary test signal/primary test setting from accessory device to hearing device. The control signal may include primary test setting. To present the primary test setting and the secondary test setting to a user may comprise to generate the primary test signal according to the control signal in the hearing device, e.g. based on primary test setting of the control signal.

To present the primary test setting and the secondary test setting to a user optionally comprises to output a secondary test signal according to the secondary test setting. The secondary test signal may be an audio signal. The secondary test signal may be output via loudspeaker or receiver of a hearing device. To present the primary test setting and the secondary test setting to a user optionally comprises to generate the secondary test signal according to the secondary test setting in accessory device and to stream the secondary test signal from accessory device to hearing device. To present the primary test setting and the secondary test setting to a user optionally comprises to transmit a control signal indicative of secondary test signal/secondary test setting from accessory device to hearing device. The control signal may include secondary test setting. To present the primary test setting and the secondary test setting to a user may comprise to generate the secondary test signal according to the control signal in the hearing device, e.g. based on secondary test setting of the control signal.

The fitting agent is configured to obtain a primary test setting also denoted x, x_ref, or $x^{ref}$ for the hearing device. The primary test setting x_ref is a vector comprising M hearing device parameters for the hearing device. The hearing device parameters may comprise one or more of filter coefficients, compressor settings, gains, or other parameters relevant for the operation of or signal processing in the hearing device. The primary test setting may be based on and/or dependent on the present environment. In other words, the primary test setting may be based on and/or dependent on the environment data. The primary test setting may be based on and/or dependent on one or more environment probabilities including a first environment probability ENVP_1 indicative of the present environment being a first environment and/or a second environment probability ENVP_2 indicative of the present environment being a second environment. The primary test setting may be a weighted combination (with environment probabilities as weights ENVP_k) of test settings for the environments ENV_k, k=1, 2, . . . , K.

The fitting agent is configured to obtain a secondary test setting also denoted x', x_alt, or $x^{alt}$ for the hearing device. The secondary test setting x_alt is a vector comprising M hearing device parameters for the hearing device. The hearing device parameters may comprise one or more of filter coefficients, compressor settings, gains, or other parameters relevant for the operation of or signal processing in the hearing device. The secondary test setting may be based on and/or dependent on the present environment. The secondary test setting may be based on and/or dependent on the present environment. In other words, the secondary test setting may be based on and/or dependent on the environment data. The secondary test setting may be based on and/or dependent on one or more environment probabilities including a first environment probability ENVP_1 indicative of the present environment being a first environment and/or a second environment probability ENVP_2 indicative of the present environment being a second environment. The secondary test setting may be a weighted combination (with environment probabilities as weights ENVP_k) of test settings for the environments ENV_k, k=1, 2, . . . , K.

The fitting agent, such as one or more processors of the fitting agent, is configured to obtain, such as receive and/or detect, a user input of a preferred test setting indicative of a preference for either the primary test setting or the secondary test setting.

The non-preferred test setting is the primary test setting or the secondary test setting not being selected as a preferred test setting. Accordingly, a hearing device and/or accessory device(s) implementing the fitting agent or at least a part of the fitting agent may comprise one or more user interfaces for obtaining, such as receiving and/or detecting, a user input. For example, the hearing device may comprise a user interface receiving a user input. The user interface of the hearing device may comprise one or more buttons, an accelerometer and/or a voice control unit. The accessory device may comprise a user interface. The user interface of the accessory device may comprise a touch sensitive surface, e.g. a touch display, and/or one or more buttons. The user interface of the accessory device may comprise a voice control unit. The user interface of the hearing device may comprise one or more physical sliders, knobs and/or push buttons. The user interface of the accessory device may comprise one or more physical or virtual (on-screen) sliders, knobs and/or push buttons.

The fitting agent is configured to obtain, such as detect, a user input of a preferred/selected test setting indicative of a preference for either the primary test setting or the secondary test setting. In the fitting agent, to detect a user input of a preferred test setting indicative of a preference for either the primary test setting or the secondary test setting may comprise prompting the user for the user input, e.g. by a beep tone signal or voice signal from the hearing device and/or a visual, haptic and/or audio prompt from an accessory device. Detecting a user input may be performed on the hearing device, e.g. by a user activating a button and/or an accelerometer (e.g. single or double tapping the hearing device housing) in the hearing device. To detect a user input may be performed on an accessory device, e.g. by a user selecting a user interface element representative of the preferred test setting, e.g. on a touch-sensitive display of the user accessory device.

The method or at least parts thereof may be performed in one or more electronic devices, such as a hearing device and/or accessory device(s). The method or at least parts thereof may be performed in an accessory device or a plurality of accessory devices, such as in a smartphone optionally in combination with a smartwatch. The method may be a computer-implemented method. The fitting agent/method may be for/part of one or more of optimizing, determining, fitting, tuning, and modelling, such as determining hearing device parameters of a hearing device. Performing part(s) of the method in accessory device(s), such as a smartphone optionally in combination with a smartwatch, may be advantageous in providing a smoother user input and user experience. Further, performing part(s) of the method in accessory device(s) may be advantageous in providing a more power efficient method from the perspective of the hearing device. The method or at least parts thereof may be performed in a server device and/or in a fitting device.

The present disclosure relates to a fitting agent for a hearing device, and in particular to a fitting agent for one or more of optimizing, determining, fitting, and tuning hearing device parameters of a hearing device.

The user model optionally represents one or a plurality of probabilistic descriptions of user responses, when comparing two sets of hearing device parameter settings. Integral parts of the user model include one or more, such as a plurality of user preference functions and one or more, such as a plurality of distributions of the user responses to the presented choices of parameters. The user model comprises one or more distributions of parameters of the respective user preference functions. In other words, each user preference function has an associated distribution of hearing device parameters. In other words, the user model may include a first user preference function and associated first user response distribution, wherein the first user preference function is optionally associated with a first environment.

For a binary response system $r \in \{0,1\}$ to the pairwise comparison trial with parameter settings {x, x'}, the user model may be specified by the probability:

$$p(r|x,x',\theta,\Lambda)=Ber(r|\Phi(f(x;\theta,\Lambda)-f(x',\theta,\Lambda))), \tag{1}$$

Where $\Phi(\cdot)$ is the cumulative distribution function (CDF) of the standard Normal distribution, and $f$ or $f(x;\theta,\Lambda)$ is the user preference functions. The user preference functions $f(x;\theta,\Lambda)$ may be given by:

$$f(x;\theta,\Lambda)=-((x-\theta)^T\Lambda(x-\theta))^v, \tag{2}$$

Where v is a real-valued exponent. The real-valued exponent v may be in the range from 0.01 to 0.99. The real-valued exponent v may be less than 0.5 such as in the range from 0.01 to 0.45. The real-valued exponent v may be larger than 0.5 such as in the range from 0.55 to 0.99. In one or more exemplary fitting agents/methods, the real-valued exponent v may be in the range from 0.25 to 0.75, such as 0.5. T indicates vector transposition.

The user preference function, $f(x,\theta,\Lambda)$, may be parametric functions of hearing device parameters $x \in [0,1]^M$ with known form but unknown shape. This shape is optionally characterized by fitting or tuning parameters, $\theta \in [0,1]^M$ and a scaling matrix $\Lambda$, which represents the user sensitivity to parameter changes. The scaling matrix $\Lambda$ may be a positive-definite scaling matrix $\Lambda$. The scaling matrix may be a diagonal matrix $\Lambda=\mathrm{diag}([\lambda_1, \lambda_2, \ldots, \lambda_M)])$, $\lambda_m \in \mathbb{R}^+$, $m=1,2,\ldots,M$. The user preference functions may be unimodal.

A vector of hearing device parameters is optionally defined on an M-dimensional continuous compact surface. In particular, hearing device parameters x are optionally defined on an M-dimensional hyper-cube, i.e., $x \in [0,1]^M$. In one or more exemplary fitting agents/methods, the hearing device parameters may be normalized by their physical range. The fitting agent/method, is configured to find optimized/improved values of hearing device parameters, also denoted $\theta$ for a particular user. The number M of hearing device parameters may be 1 and/or less than 100, such as in the range from 10 to 50. The number M of hearing device parameters may be larger than 20, such as in the range from 25 to 75.

Parameter transformation can be applied to parameters $\theta$ and $\Lambda$. The parameters $\theta$ and $\Lambda$ may be transformed by:

$$\alpha_j=\Phi^{-1}(\theta_j), \tag{3a}$$

$$\gamma_j=\ln \lambda_j, \tag{3b}$$

where $\lambda=\mathrm{diag}(\Lambda)$, and where $\alpha_j \in \mathbb{R}$ and $\gamma_j \in \mathbb{R}$. The non-linear monotonic transformation guarantees that the values of $\theta$ are constrained to the [0,1] m hyper-cube during the learning process of the agent, i.e. during one or multiple trials of presenting a primary and secondary test setting to the user and obtaining their preference of the two test settings. Similarly, the transformation of the user sensitivity, $\Lambda$, constrains this parameter to the positive real subspace. Along with the reasons mentioned further above these transformations is to make it reasonable to assume Gaussian priors on the transformed parameters.

For latent, i.e. unobserved, parameters $z=[\alpha; \gamma]$, the transformation to $\theta$, $\Lambda$ may be represented by:

$$p(\theta,\Lambda|z)=\delta(z-(\Phi^{-1}(\theta); \ln(\mathrm{diag}(\Lambda)))), \tag{4}$$

where the semicolon indicates a column-wise concatenation.

For a given set $\{\hat{x}_{i,n}, \hat{x}'_{i,n}, \hat{r}_{i,n}\}$ of N trials and responses for a user i, based on the user model (1), a likelihood function for $z_i$, i.e. the latent variables for user i, maybe formulated as:

$$L(z_i)=\prod_{n=1}^{N} p(\hat{r}_{i,n} \mid \hat{x}_{i,n}, \hat{x}'_{i,n}, z_i). \tag{5}$$

For each user $i \in \{1, \ldots, K\}$ the preferences may be processed into the likelihood functions $L(z_i)$, where $z_i$ are the preference function parameters for user i. Thus, the likelihood functions $L(z_i)$ can be used to obtain a collaborative prior. Additionally, user characteristics or features, $u_i$, are known for each or some of user i. These features are related to individual preferences, and may include age, gender, and also audiometric measurements (e.g., the audiogram), and lifestyle features such as activity level and the number of hours of TV time per day. Note that these features can be measured upfront, before a user makes use of her hearing aid. Thus, the agent can assume that the users who have similar features have similar (but not identical) preferences. Thus, in order to obtain a good prior for a new user, the agent will use preference information of similar reference users. In other words, if the agent measures/obtains characteristics $u_{K+1}$ related to the user, then the likelihood functions $L(z_i)$ can be used to obtain an improved prior for $z_{K+1}$ that is collaborative prior.

The similarities between user K+1 and other users may be measured by $\rho(u_i, u_{K+1}) \geq \epsilon$, where $\rho$ is a distance measurement, and where $\epsilon$ is an appropriate threshold.

The latent parameters for user i, $z_i$, may be linearly predicted by:

$$p(z_i|u_i, W)=N(z_i|Wb(u_i), \Sigma_z), \tag{6}$$

where $b(u_i)$ is a vector of basis functions on the features $u_i$ of user i, and W matrix with regression coefficients shared by all users, i.e. the new user and the reference users. Thus, W can be trained based on the data of all users.

Priors may be specified for W. Since W is a matrix it may be defined as a vector w=vec(W), and a vague Gaussian prior may be specified on w by:

$$p(w) = \mathcal{N}\left(w \mid \mu_w, (1/\xi)I\right), \tag{7}$$

where ξ is a precision parameter. The transformation from w to W may be given by:

$$p(W \mid w) = 6(w - vec(W)), \tag{8}$$

The generative model of the collaborative agent may be defined by equations (1), (4), (6), (7), and (8) by:

$$p(w, W, z_{1:K+1}, \theta_{1:K}, \Lambda_{1:K}, r_{1:K1:N} \mid u_{1:K+1}, x_{1:K1:N}, x'_{1:K1:N}) = p(w)p(W \mid w)p(z_{K+1} \mid u_{[K+1\}}, W)\prod_{i=1}^{K} p(z_i \mid u_i, W)p(\theta_i, \Lambda_i \mid z_i)\prod_{n=1}^{N} p\left(r_{i,n} \mid x_{i,n}, x'_{i,n}, \theta_i, \lambda_i\right) \tag{9}$$

Given this model the collaborative prior is obtained as follows $$p=(z_{K+1} \mid u_{K+1})=\int p(w, W, z_{1:K+1}, \theta_{1:K}, \Lambda_{1:K}, r_{1:K,1:N} \mid u_{1:K+1}, x_{1:K,1:N}, x'_{1:K,1:N})dw, \ldots, x'_{1:K,1:N}$$

Thereby, when a new user, i.e. the user, initiates interactions with the agent, the agent may use known data, i.e. reference posterior, from reference users, $u_{1:K}$, as a prior to get an informed starting point to generate the primary and/or secondary user test settings.

Alternatively, probabilistic model of collaborative prior for the user preference can be obtained in the form of joint Gaussian distribution. The joint distribution for z and u is assumed to be:

$$p(z, u) \approx N\left(\begin{bmatrix} z \\ u \end{bmatrix} \middle| \begin{bmatrix} |\mu_z \\ \mu_u \end{bmatrix}, \begin{bmatrix} \sum_{zz} & \sum_{zu} \\ \sum_{uz} & \sum_{uu} \end{bmatrix}\right)$$

Then conditional distribution for the new user can be computed as $$p(z_{new\overline{W}} \mid u_{new}) = N\left(z \mid \bar{\mu}_z, \overline{\sum}_z\right),$$

where $$\bar{\mu}_Z = \mu_Z + \sum_{zu} \sum_{uu}^{-1} \left(u_{n\varepsilon^3 w} - \mu_u\right)$$

$$\rightarrow^{\Sigma Z} = \sum_{zz} - \sum_{zu} \sum_{uu}^{-1} \sum_{uz}$$

The fitting agent is configured to update the user model based on hearing device parameters of the preferred test setting, a non-preferred test setting and optionally the environment data. In particular, the fitting agent may be configured to update the user model based on (r, x_ref, x_alt, s). To update the user model may comprise to update the user preference function, or at least parameters thereof and/or to update parameter distributions associated with user preference functions, based on environment data and one or more of the primary test setting, the secondary test setting and the user input of a preferred test setting. In other words, the parameters of the user preference function and/or associated parameter distributions may be updated based on the result of the trial including the primary test setting, the secondary test setting, the preferred test setting of the primary test setting and the secondary test setting, and environment data. To update the user model may comprise to update the user response distribution(s), or at least parameters thereof, based on environment data and one or more of the primary test setting, the secondary test setting and the user input of a preferred test setting. In other words, the parameters of the user preference function may be updated based on the result of the trial including the primary test setting, the secondary test setting, the preferred test setting of the primary test setting and the secondary test setting, and environment data. To update the user model may comprise to update the user response distribution(s), or at least parameters thereof, based on one or more environment probabilities optionally including a first environment probability and a second environment probability.

In one or more exemplary fitting agents and/or methods, to update the user model may be based on Bayesian inference. Updating the user model may comprise updating one or more of the parameters of the user preference function and/or user response distribution(s) and/or environmental model and/or parameter distributions associated with the user preference functions. Updating the user model may comprise to determine one or more posteriors of parameters of the user preference function(s).

To update the user model may comprise to determine a posterior of the parameters of one or more of, such as a subset of or all the user preference functions, e.g. based on the environment data, a previous parameter posterior, such as the last or current parameter posterior, preferred test setting, and a non-preferred test setting.

A trial for a user defines a pair of test settings including a primary test setting and a secondary test setting. A user response is obtained to a user's pairwise comparison of test settings from a trial, defined by a pair {x_ref, x_alt} of test settings, where the primary test setting x_ref and the secondary test setting x_alt are the so-called reference and alternative parameter proposal, respectively. In other words, a trial T_n also denoted $D_n$ is performed, where each trial T_n comprises or is defined by primary test setting $$x_n^{ref},$$

secondary test setting $$x_n^{alt}$$

and preferred/selected test setting $r_n$. The index n−1 refers to the previous trial T_n−1.

The generative distributions of the fitting agent defined by a sequence of $$P_t^a$$

describes the generative process for the next trial $$\left\{x_t^{ref}, x_t^{alt}\right\}$$

as a weighted combination of proposals for possible environments. The generative predictive distribution $$P_t^u$$

characterizes the user response distribution for some next trial $$\{x_t^{ref}, x_t^{alt}\}.$$

The primary test settings/reference proposals $$x_{k,t}^{ref}$$

are defined in a deterministic way based on the user response in the previous trial. Secondary test settings/alternative proposals $$x_{k,t}^{alt}$$

are generated from the user preference posterior, since from the optimization point of view the goal of the fitting agent is get to the optimum as quickly as possible and, thus, provide a better option than a reference proposal, with high probability. Clearly, this option would correspond to the user preference or the fitting agent estimate of it.

The profile may comprise one or more of age data, gender data, activity data, and hearing loss data indicative of a hearing loss of the user, and wherein to obtain a group of reference users is based on the profile. To obtain a group of reference users may comprise to determine a similarity measure indicative of similarity between the user and the group of reference users. As described above, a set of references with more similarities with the user should result in a better reference posterior and thereby a better collaborative user preference distribution/prior, whereby the agent will be capable of generating more relevant test settings, which in turn results in the agent converging the parameters preferred by the user in fewer trials.

The reference posteriors may be obtained based on the environment data. It will be advantageous to choose reference posteriors generated in similar or identical environments to the present environment of the user as this increases the likelihood that the reference posteriors will be a good starting point for the fitting agent to initiate trials with the user in their present environments.

Though what environmental data is being collected depends on a moment of time initialization happens, the user will in the end encounter many different environments. The fitting agent or the user may initiate new trials when a new environment is encountered. This may mean that initialization for all of them does not happen at the same time.

The fitting agent may initiate a trial in response to the user moving into a new environment. This may comprise obtaining new reference posteriors suited for the new environment. The fitting agent may generate and present new secondary test settings upon detecting a new environment. It is advantageous that the fitting agent monitors the environment of the user as the user's preferences may not be identical over all environments. The fitting agent may therefore automatically initiate a trial and prompt the user to evaluate the the primary test, e.g. their current setting, against the secondary test setting, e.g. an alternative setting predicted by the fitting agent to be better suited for the user given their present environment.

To determine a first initial environment probability of a first environment and a second initial environment probability of a second environment is based on an environment model.

In one or more example fitting agents, to obtain environment data comprises to obtain audio data and optionally determining the environment data based on the audio data and/or including the audio data in the environment data. In other words, one or more processors of the fitting agent may be configured to obtain audio data and determining the environment data or at least one or more environment parameters based on the audio data. Audio data may comprise first audio data representing or being indicative of audio recorded by one or more microphones of a hearing device of the user. Audio data may comprise second audio data representing or being indicative of audio recorded by one or more microphones of an accessory device or accessory devices of the user. Audio data may comprise third audio data representing or being indicative of audio wirelessly transmitted to a hearing device of the user. For example, the fitting agent may be configured to classify the environment based on hearing device audio and set one or more environment identifiers and/or environment probabilities of the environment data accordingly.

In one or more example fitting agents, to obtain environment data comprises to obtain context data and optionally determining the environment data based on the context data and/or including the context data in the environment data. In other words, one or more processors of the fitting agent may be configured to obtain context data and optionally determining the environment data based on the context data. Context data may be indicative of the context in which the user is in, such as indicative of a user's location, position, movement, temperature, pulse, or other data relevant for the environment. For example, the context data may comprise location data, e.g. GPS coordinates, and/or movement data, such as accelerometer data. The context data may comprise calendar data, and the environment data may be based on the calendar data. The context data may comprise sensor data, e.g. from one or more sensors of an accessory device and/or from one or more sensors of the hearing device. The context data may comprise hearing device data transmitted from the hearing device, such as one or more program identifiers, one or more operating parameters, and/or one or operating mode identifiers of the hearing device.

In one or more example fitting agents, to obtain environment data comprises to receive user input indicative of the environment, e.g. via a user interface of an accessory device. Thus, the user may select and indicate the present environment via accessory device, e.g. from a list of environments presented on a touch-display of the accessory device.

The first environment probability may be indicative of a probability that the present environment is a first environment. The first environment may be an environment of a first type, such as an environment characterized by a low SNR and high sound level/power, such as a cocktail party or a concert.

The second environment probability may be indicative of a probability that the present environment is a second environment. The second environment may be an environment of a second type, such as an environment characterized by low SNR and medium sound level/power.

In one or more example fitting agents, the fitting agent is configured to determine and update hearing device parameters of the hearing device based on the updated user model and/or the environment data, such as environment probabilities of the environment data.

It is noted that descriptions and features of fitting agent functionality also applies to methods and vice versa.

The collaborative user preference distribution may be based on a joint Gaussian distribution.

The collaborative user preference distribution may be based on linear regression having shared parameters for the reference users.

The group of reference users may comprise at least 1,000 reference users. In general it is advantageous to have as many reference users as possible as this increases the amount of data available. However, as it is not possible to obtain the preferences of all people for all environments compromises will have to be made. It has been found that the critical mass of information may be around 1,000 reference users, where it becomes exceedingly likely that the reference posterior will produce an acceptable prior for the user.

To obtain environment data may comprise obtaining position data indicative of a user position and determine the environment data based on the position data. To obtain environment data may comprise obtaining audio data indicative of sound in the present environment and determine the environment data based on the audio data. To obtain environment data may be based on microphone signals capture by the hearing device and/or the accessory device. To obtain environment data may comprise obtaining context data indicative of the surroundings and/or activity of the user and determine the environment data based on the context data.

FIG. 1 is an overview of a hearing system with a fitting agent according to the present disclosure. The hearing system comprises a hearing device 2, an accessory device 4, and optionally a server device/fitting device 5. The hearing device 2 comprises a transceiver module 6 for (wireless) communication with the accessory device 4 and optionally a contralateral hearing device (not shown in FIG. 1). The transceiver module 6 comprises antenna 8 and transceiver 10, and is configured for receipt and/or transmission of wireless signals via wireless connection 11 to the accessory device 4. The accessory device 4 is configured for receipt and/or transmission of wireless signals via wireless connection 11A to the server device/fitting device 11A. The hearing device 2 comprises a set of one or a plurality of microphones comprising a first microphone 12 for provision of a first microphone input signal 14; a processor 16 for processing input signals including the first microphone input signal 14 according to one or more hearing device parameters and providing an electrical output signal 18 based on input signals; an optional user interface 20 connected to the processor 16; and a receiver 22 for converting the electrical output signal 18 to an audio output signal.

The accessory device 4 is a smartphone and comprises a user interface 24 comprising a touch display 26, a processor (not shown), and a memory (not shown).

In the hearing device system 1, the fitting agent 27 is an application installed in the memory of the accessory device 4.

The fitting agent 27 is a fitting agent for update of a user model for a hearing device user and/or one or more of optimizing, determining, fitting, tuning, and modelling hearing device parameters of a hearing device. The fitting agent 27 comprises one or more processor configured to initialize a user model comprising a plurality of user preference functions and associated user response distributions; obtain a test setting comprising a primary test setting x_ref and a secondary test setting x_alt for the hearing device; present the test setting to the hearing device user e.g. via wireless connection 11; obtain/detect a user input r of a preferred test setting indicative of a preference for either the primary test setting x_ref or the secondary test setting x_alt; and update the user model, such as the user preference function $f(x; \theta, \Lambda)$ and/or a user response model (user response distribution and parameter distribution) based on hearing device parameters of the preferred test setting, such as one or more, e.g. all of r, x_ref, and x_alt.

The fitting agent 27 implemented in the accessory device 4 is configured to update the user model, such as a plurality of user preference functions of the user model, based on the primary test setting, the secondary test setting, the preferred test setting, and the environment data, such as environment probabilities of environments. In other words, the fitting agent is configured to update the user model based on hearing device parameters of the preferred test setting and the environment data. To update the user model may comprise updating the user preference models and the user response models based on the primary test setting, the secondary test setting, the preferred test setting, and the environment data. The fitting agent 27/accessory device 4 may be configured to transmit the primary test setting, the secondary test setting, and the preferred test setting to server device 5 that updates the user model and transmits the updated user model to the fitting agent 27/accessory device 4. Thus, fitting agent 27/accessory device 4 may be configured to receive the updated model from the server device 5. In other words, the fitting agent 27 may be distributed on accessory device 4 and one or more of hearing device 2 and server device 5. Thus, the fitting agent 27 may comprise a first part 27A implemented in accessory device 4, optional second part 27B implemented in server device, and optional third part 27C implemented in hearing device 2, such as in processor 16.

The fitting agent 27/accessory device 4 is configured to obtain reference posteriors of reference users, i.e. data about preferred hearing device parameters of other users, from the server device 5 via the wireless connection between accessory device and server device 11A. The fitting agent 27/accessory device 4 is configured to determine a collaborative user preference distribution based on the reference posteriors based on the posteriors of reference users, set the collaborative user preference distribution as a prior associated with the user; and initialize the user model based on the prior. In doing so, the agent will be capable of generating the primary and/or secondary test settings from a better-informed starting point, thus making it more likely to generate test settings which will be liked by the user.

In one or more example fitting agents including fitting agent 27, 27A, 27B, 27C, to update the user model comprises to determine posteriors of parameters of the user preference functions, e.g. based on a previous parameter posteriors, such as the last or current parameter posteriors, the preferred test setting, and a non-preferred test setting. To determine the parameter posterior optionally comprises to apply sequential estimation in the fitting agent 27, 27A, 27B, 27C. Thus, the fitting agent 27, 27A, 27B, 27C is optionally configured to determine the parameter posterior based on only the previous user model and (r, x_ref, x_alt, s).

The reference posteriors of reference users may have been generated through the respective reference users' own interactions with other fitting agents or it may have been generated from fitting sessions with hearing care professionals. The fitting agent 27/accessory device 4 may be configured to upload the user's posterior data to the server device 5, either continuously throughout the user's interactions with the fitting agent 27 or after the fitting agent has gathered a critical mass of posterior data, e.g. after the fitting agent 27 reduces an uncertainty level of the user below a preset threshold.

In one or more example fitting agents including fitting agent 27, 27A, 27B, 27C, to obtain environment data comprises to obtain audio data and determining the environment data based on the audio data. For example, microphone 12 of the hearing device 2 may provide audio data representative of the sound received by the microphone 12, wherein the audio data can be transmitted to the accessory device 4 wherein the fitting agent 27, 27A of the accessory device 4 is configured for determining the environment data based on the audio data from the hearing device and/or wherein the fitting agent 27C of the hearing device 2 is configured for determining the environment data or at least a part of the environment data based on the audio data from microphone 12. The environment data determined by fitting agent 27C of the hearing device 2 is transmitted to the fitting agent 27A of the accessory device 4 for further processing.

In one or more example fitting agents including fitting agent 27, 27A, 27B, 27C, to obtain environment data comprises to obtain context data, e.g. from one or more sensors of the hearing device 2 and/or accessory device 4, and determining the environment data based on the context data. Determining the environment data may be based on the audio data and the context data. In one or more example fitting agents including fitting agent 27, 27A, 27B, 27C, to obtain context data comprises to obtain context data from one or more applications, such as a calendar application, of the accessory device 4.

In one or more example fitting agents including fitting agent 27, 27A, 27B, 27C, the environment data comprises a first environment probability of a first environment and/or a second environment probability of a second environment, and wherein to update the user model is based on the first probability and/or the second probability.

In one or more example fitting agents including fitting agent 27, 27A, 27B, 27C, to obtain a test setting comprising a primary test setting and a secondary test setting for the hearing device comprises to determine the secondary test setting based on the environment data.

In one or more example fitting agents including fitting agent 27, 27A, 27B, 27C, the fitting agent is configured to determine and update hearing device parameters of the hearing device based on the updated user model and optionally the environment data.

In an implementation including accessory device 4, the fitting agent 27/accessory device 4 may be configured to send a control signal 30 to the hearing device 2, the control signal 30 being indicative of the primary test setting and the secondary test setting, thus enabling the hearing device 2 to output test signals accordingly.

The hearing device 2 (processor 16) is optionally configured to output a primary test signal according to the primary test setting via the receiver 22 and a secondary test signal according to the secondary test setting via the receiver 22.

The fitting agent 27, 27A, 27C (hearing device 2 (processor 16) and/or the accessory device 4) is configured to detect a user input of a preferred test setting indicative of a preference for either the primary test setting or the secondary test setting, e.g. by detecting a user input on user interface 20 or by detecting a user selection of one of a primary virtual button 32 (primary test setting is preferred) and a secondary virtual button 34 (secondary test setting is preferred) on the user interface 24 of accessory device 4.

It is to be noted that the fitting agent 27, 27A, 27B, 27C may be configured to detect a user input of a preferred test setting indicative of a preference for either the primary test setting or the secondary test setting, e.g. by receiving a wireless input signal from a secondary accessory device, such as smartwatch comprising a user interface. Thereby, a more convenient user input is provided for, which in turn increases the user friendliness of the fitting agent.

A user may initiate the method/update of the user model by pressing start button 28 on the user interface of accessory device 24. In other words, the fitting agent may detect user input indicative of start and perform the method/update of the user model in accordance with detection of the user input indicative of start.

In an implementation including accessory device 4, the accessory device 4 may be configured to send a control signal 38 to the hearing device 2, the control signal 38 being indicative of the hearing device parameters of the preferred test setting, thus enabling the hearing device to update and apply preferred hearing device parameters in the hearing device.

Figure 2:
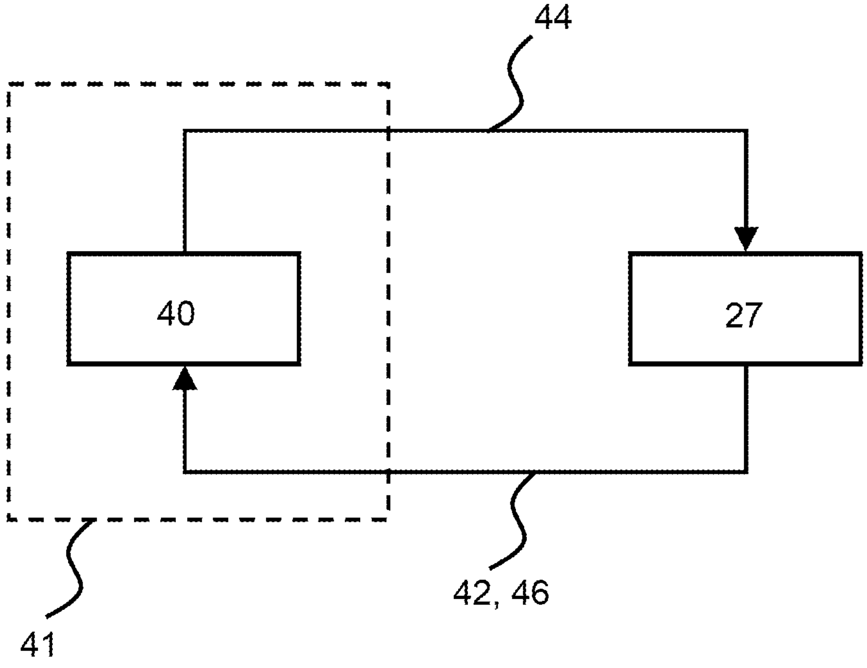
FIG. 2 illustrates interaction between a user and a fitting agent.

FIG. 2 illustrates interaction between a user 40 in an environment 41 and a fitting agent 27. The fitting agent 27 obtains environment data indicative of the present environment 41, e.g. based on audio data and/or context data from one or more hearing device worn by user 40, from user providing user input to fitting agent, from accessory device microphone, sensors, and/or applications. For each interaction or trial indexed with index n, the fitting agent generates a primary test setting $$x_n^{ref}$$

and a secondary test setting $$x_n^{alt}$$

and presents 42 the test settings $$x_n^{ref}$$

and $$x_n^{alt}$$

for the user, e.g. by controlling hearing device for outputting primary test signal and secondary test signal respectively according to and indicative of the primary test setting and the secondary test setting. The user evaluates the two test settings $$x_n^{ref}$$

and $x_n^{alt}$, and the fitting agent 27 receives and detects the user's response 44, $r_n$ indicative of the preferred test setting of the primary test setting and the secondary test setting. The fitting agent updates the user model based on environment data, $r_n$, $x_n^{ref}$, and $x_n^{alt}$ The fitting agent generates n+1'th trial $|\{x_{n+1}^{ref}; x_{n+1}^{alt}\}$, by determining the primary test setting $x_{n+1}^{ref}$ of the n+1'th trial based on the preferred test setting of the n'th trial and environment probabilities of the n+1'th trial, determines secondary test setting $x_{n+1}^{alt}$ and presents 46 the test settings $x_{n+1}^{ref}$ and $x_{n+1}^{alt}$ for the user.

Figure 3:
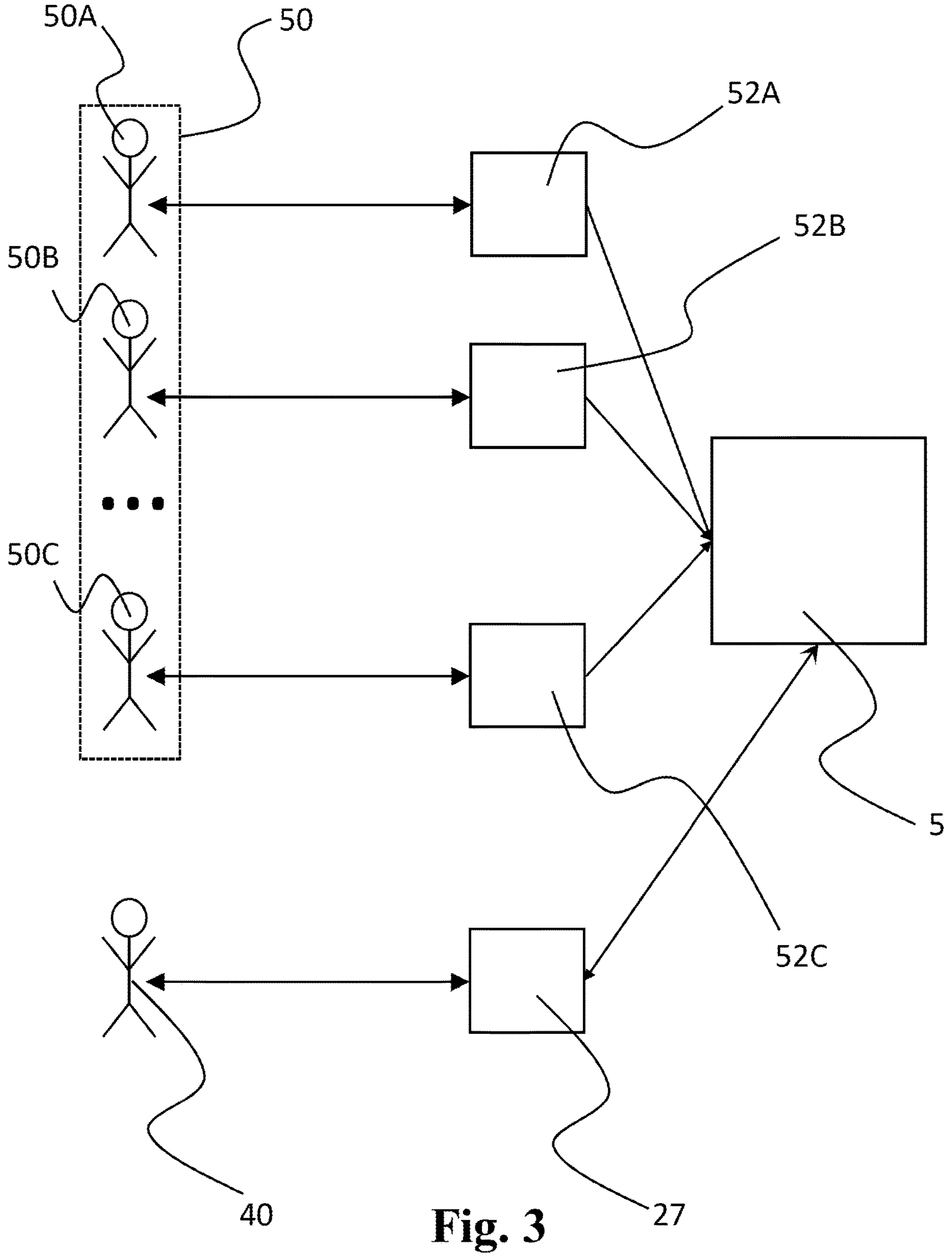
FIG. 3 shows a diagram of a network of fitting agents connected to a server device.

FIG. 3 shows a diagram of a network configured to obtain, store and distribute reference user priors. The group of reference users 50 comprise user 1 50A, user 2 50B, and so forth up to user K 50C, whom through interactions with their respective fitting agents and/or hearing care professionals 52A, 52B, 52C have generated reference posteriors indicative of their respective preferred hearing device parameters. The reference posteriors are uploaded to the server device 5, preferably along with profile data linked to each reference user 50.

When a new user 40, $u_{K+1}$, initiates their fitting agent 27, the fitting agent 27 may query the server device 5 for reference posteriors. The query may comprise data relating to the new user's profile so that the server device 5 may return reference posteriors from reference users with similar profiles to the new user. The fitting agent 27 may thus start trials with the new user on an informed basis rather than starting from scratch.

Figure 4:
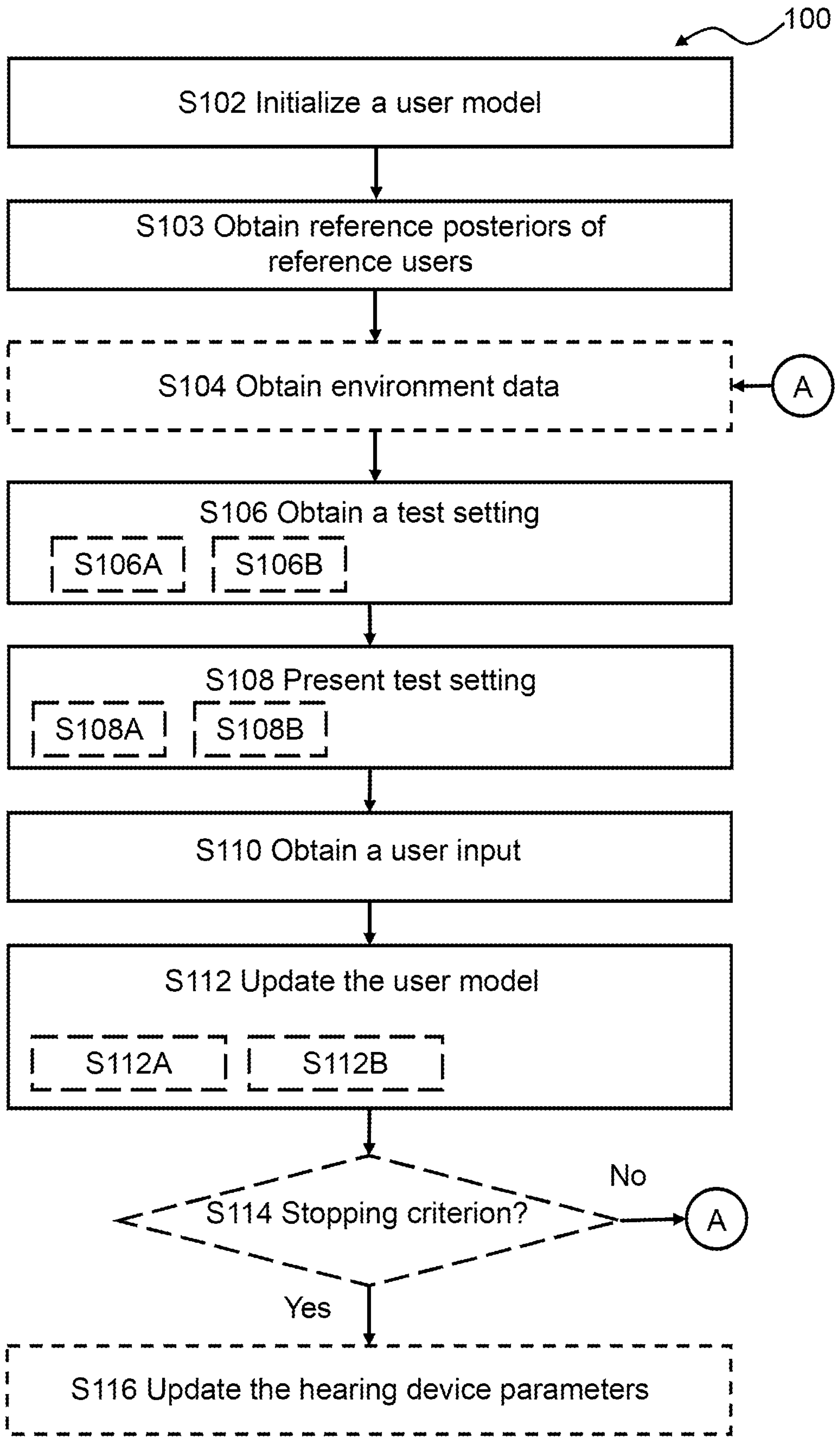
FIG. 4 is a flow diagram of an exemplary method according to the present disclosure.

FIG. 4 is a flow diagram of an exemplary method according to the present disclosure. The method 100 is a method of updating a user model for a hearing device user and/or for one or more of optimizing, determining, fitting, tuning, and modelling, such as determining hearing device parameters of a hearing device, wherein the method comprises initializing S102 a user model comprising a plurality of user preference functions and associated user response distributions, wherein each user preference function is associated with an environment; obtaining reference posteriors of reference users in the group of reference users S103, wherein a reference posterior is a posterior of the preferred hearing device parameters of a reference user in the group; determining a collaborative user preference distribution based on the reference posteriors; setting the collaborative user preference distribution as a prior associated with the user; optionally obtaining S104 environment data indicative of a present environment; obtaining S106 a test setting comprising a primary test setting S106A and a secondary test setting S106B for the hearing device; presenting S108 the test setting to the hearing device user including outputting S108A a primary test signal in accordance with or based on the primary test setting and outputting S108B a secondary test signal in accordance with or based on the secondary test setting; obtaining S110 a user input of a preferred test setting indicative of a preference for either the primary test setting or the secondary test setting; and updating S112 the user model based on hearing device parameters of the preferred test setting and non-preferred test setting and the environment data. Updating S112 the user model optionally comprises updating S112A a plurality of, such as a subset of or all of, the user preference functions of the user model. Updating S112 the user model optionally comprises updating S112B a plurality of, such as all of, the predictor/user response models of the user model.

In the method 100, updating S112 the user model may comprise determining S112A posteriors of the parameters of user preference functions of the user model based on a previous or latest parameter posterior, the preferred test setting, the non-preferred test setting, and the environment data. It is noted that obtaining environment data S104 is optional and if not present, A will connect to S106 Obtain a test setting instead, i.e. the method will jump to S106 rather than S104.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information in a part of the memory.

Furthermore, the labelling of a first element does not imply the presence of a second element and vice versa.

It may be appreciated that FIGS. 1-4 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 hearing device system
2 hearing device
4 accessory device
5 server device
6 transceiver module
8 antenna
10 transceiver
11 wireless connection between hearing device and accessory device
11A wireless connection between accessory device and server device
12 first microphone
14 first microphone input signal
16 processor
18 electrical output signal
20 user interface
22 receiver
24 user interface of accessory device
26 touch display
27 fitting agent
27A first part of fitting agent
27B second part of fitting agent
27C third part of fitting agent
28 (virtual) start button
30 control signal indicative of primary and secondary test setting
32 primary virtual button
34 secondary virtual button
38 control signal indicative of the hearing device parameters of the preferred test setting
40 user
41 environment
42 n'th trial, test settings $$x_n^{ref}$$

and $$x_n^{alt}$$

44 user response to n'th trial
46 n+1'th trial, test settings $$x_{n+1}^{ref}$$

and $$x_{n+1}^{alt}$$

50 reference users
50A reference user 1, $u_1$
50B reference user 2, $u_2$
50C reference user K, $u_K$
52A agent of reference user 1
52B agent of reference user 2
52C agent of reference user K
100 Method of updating a user model for a hearing device user and/or for determining hearing device parameters of a hearing device
S102 initializing a user model
S103 obtain reference posteriors of reference users

S104 obtaining environment data
S106 obtaining a test setting
S106A obtaining a primary test setting
S106B obtaining a secondary test setting
S108 presenting the test setting to the hearing device user
S108A outputting a primary test signal
S108B outputting a secondary test signal
S110 obtaining a user input
S112 updating the user model
S112A determining posteriors of parameters of the user preference functions of the user model based on a previous parameter posterior, the preferred test setting, a non-preferred test setting, and the environment data
S114 determining whether stopping criterion is satisfied
S116 updating the hearing device parameters

The invention claimed is:

1. A fitting system for a hearing device system comprising a hearing device worn by a user, wherein the fitting system comprises one or more processors configured to:
- initialize a user model comprising a user preference function and a user response distribution;
- obtain a test setting comprising a primary test setting and a secondary test setting for the hearing device based on the user model;
- output the primary test setting and the secondary test setting for presentation to a the user;
- obtain a user input for a preferred test setting indicative of a preference for either the primary test setting or the secondary test setting; and
- update the user model based on a hearing device parameter of the preferred test setting;
- wherein the one or more processors of the fitting system are configured to initialize the user model by:
- obtaining a profile of the user;
- obtaining reference posteriors of reference users, wherein at least one of the reference posteriors is a posterior of a preferred hearing device parameter of one of the reference users;
- determining a collaborative user preference distribution based on the reference posteriors;
- setting the collaborative user preference distribution as a prior associated with the user; and
- initializing the user model based on the prior.

2. The fitting system according to claim 1, wherein the profile of the user comprises one or more of: age data, gender data, activity data, or hearing loss data indicative of a hearing loss of the user.

3. The fitting system according to claim 1, wherein the one or more processors are configured to identify the reference users based on the profile.

4. The fitting system according to claim 1, wherein the one or more processors are configured to identify the reference users by determining a similarity measure indicative of a similarity between the user and the reference users.

5. The fitting system according to claim 1, wherein the one or more processors are configured to:
- obtain environment data indicative of a present environment; and
- determine a first initial environment probability of a first environment and/or a second initial environment probability of a second environment, based on the environment data.

6. The fitting system according to claim 5, wherein the one or more processors are configured to obtain the environment data by obtaining position data indicative of a user position, and determining the environment data based on the position data.

7. The fitting system according to claim 5, wherein the one or more processors are configured to obtain the environment data by obtaining audio data indicative of sound in the present environment, and determining the environment data based on the audio data.

8. The fitting system according to claim 5, wherein the one or more processors are configured to obtain the environment data by obtaining context data indicative of a surrounding and/or activity of the user, and determining the environment data based on the context data.

9. The fitting system according to claim 5, wherein the one or more processors are configured to determine the first initial environment probability of the first environment and/or the second initial environment probability of the second environment based on an environment model.

10. The fitting system according to claim 5, wherein the one or more processors are configured to obtain the test setting based on the environment data.

11. The fitting system according to claim 1, wherein the collaborative user preference distribution is based on a joint Gaussian distribution.

12. The fitting system according to claim 1, wherein the collaborative user preference distribution is based on linear regression of parameters for the reference users.

13. The fitting system according to claim 1, wherein the group of reference users comprise at least 1,000 reference users.

14. The fitting system according to claim 1, wherein the user model is different from the profile of the user.

15. A processor(s)-implemented method involving a user model associated with a user of a hearing device, wherein the method comprises:
- initializing the user model comprising a user preference function and a user response distribution;
- obtaining a test setting comprising a primary test setting and a secondary test setting for the hearing device based on the user model;
- outputting the primary test setting and the secondary test setting for presentation to the user;
- obtaining a user input for a preferred test setting indicative of a preference for either the primary test setting or the secondary test setting; and
- updating the user model based on a hearing device parameter of the preferred test setting;
- wherein the act of initializing the user model comprises:
  - obtaining a profile of the user;
  - obtaining reference posteriors of reference users, wherein at least one of the reference posteriors is a posterior of a preferred hearing device parameter of one of the reference users;
  - determining a collaborative user preference distribution based on the reference posteriors;
  - setting the collaborative user preference distribution as a prior associated with the user; and
  - initializing the user model based on the prior.

16. The processor(s)-implemented method of claim 15, further comprising:
- obtaining environment data indicative of a present environment; and
- determining a first initial environment probability of a first environment and/or a second initial environment probability of a second environment, based on the environment data.

* * * * *